(12) United States Patent
Brealey et al.

(10) Patent No.: US 7,644,412 B2
(45) Date of Patent: Jan. 5, 2010

(54) SEPARATE ENCAPSULATION OF COMMUNICATION OPERATIONS IN COMPUTER ALGORITHMS

(75) Inventors: Christopher Lawrence Brealey, Markham (CA); Zina Mostafia, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1396 days.

(21) Appl. No.: 10/669,396

(22) Filed: Sep. 23, 2003

(65) Prior Publication Data

US 2005/0034097 A1     Feb. 10, 2005

(30) Foreign Application Priority Data

Aug. 5, 2003  (CA) .................................. 2436633

(51) Int. Cl.
*G06F 3/00*   (2006.01)
*G06F 9/44*   (2006.01)
(52) U.S. Cl. ................. 719/315; 717/100; 717/107; 717/120
(58) Field of Classification Search ................. 719/315; 717/100, 107, 120
See application file for complete search history.

(56) References Cited

U.S. PATENT DOCUMENTS

| | | | |
|---|---|---|---|
| 5,497,491 A | 3/1996 | Mitchell et al. | 395/700 |
| 5,530,864 A | 6/1996 | Matheny et al. | 395/700 |
| 5,966,531 A * | 10/1999 | Skeen et al. | 719/315 |
| 6,049,819 A | 4/2000 | Buckle et al. | 709/202 |
| 6,336,118 B1 | 1/2002 | Hammond | 707/103 |

FOREIGN PATENT DOCUMENTS

GB   2293470   3/1996

OTHER PUBLICATIONS

Friedman, et al., "Problem Solving, Abstraction, and Design Using C++", 1997, Second Edition, pp. 9, 19-23, 27, 113-119, 469, 510-515 and 700-711.*
Sarin, S. et al. "A Process Model and System For Supporting Collaborative Work", ACM Digital Library, Xerox Advanced Information Technology, pp. 213-224.

* cited by examiner

*Primary Examiner*—Hyung S Sough
*Assistant Examiner*—Qing-Yuan Wu
(74) *Attorney, Agent, or Firm*—Steven L. Nichols; Rader, Fishman & Grauer PLLC

(57) ABSTRACT

A computer algorithm is encapsulated in at least two modules: at least one communication operation of the computer algorithm is encapsulated in a communication module, separately from the rest of the operations of the algorithm which may be encapsulated in an algorithm module. The separately encapsulated communication operation is made available to the algorithm module during its execution. Modules for data objects encapsulating data communicated may also be provided. A framework may be provided to ensure compatibility between different modules, wherein a plurality of protocols are provided and each module implements a corresponding protocol. All environment-dependent communication operations may be separately encapsulated so that one of the communication module and the algorithm module may be modified without modifying the other.

13 Claims, 5 Drawing Sheets

US 7,644,412 B2

SEPARATE ENCAPSULATION OF COMMUNICATION OPERATIONS IN COMPUTER ALGORITHMS

FIELD OF THE INVENTION

The present invention relates to encapsulating and executing computer algorithms.

BACKGROUND

It is desirable that computer programming codes be portable and reusable, i.e., that the same code for a computer algorithm can be used for different purposes and in different applications without extensive modification. Using portable and reusable codes minimizes the cost of development, maintenance, and upgrading.

A common technique for improving code portability and reusability is to encapsulate computer algorithms in modules, such as commands, routines, procedures, functions, methods, classes, and other like encapsulations known to those skilled in the art. A non-communicating module, i.e., one which does not communicate with its external environment during execution, may be completely encapsulated and thus easily ported or reused without changing its code.

However, a module may need to communicate or interact with its external environment during its execution, such as to report its status and obtain additional instructions. For example, a file-creating routine may need a confirmation from a user before overwriting an existing file. An entity that communicates information with the module is herein referred to as a "communicating partner." A communicating partner can be an information receiver, or an information provider, or both. As can be appreciated, a communicating partner can be a human operator, a physical device, or a software component (such as an object) that interacts with the executing module. A communicating partner forms part of the external environment of the executing module. Thus, the environment changes if one of the communicating partners has been changed. For example, a command procedure receiving input from a batch file or a console input device is considered to be executing in two different environments.

The need to communicate makes it difficult to encapsulate an algorithm. A module can properly communicate with a communicating partner only if they both communicate in a compatible way. Incompatibility may arise due to the use of incompatible data formats or data types for the same information. Further, with different communicating partners, or, in different environments, different information may need to be communicated or different operations may need to be performed for processing the information. For instance, the file writing routine discussed earlier may receive instructions from a human operator through different devices (such as a keyboard or a mouse) or from a data object (such as a file) that contains pre-stored instructions. In each case, the information provider is different, the data to be transmitted is different, and the operations to be performed may be different. For example, a message of "do not overwrite" may be provided to the routine by one or more key strokes (in the case of keyboard input), by one or more mouse clicks at one or more pre-defined locations on a monitor screen (in the case of mouse input), or by a text string or a numerical value (in the case of a data object).

Under known programming approaches, code modification is often required when a communicating module is to be used in a new environment. In order to improve code portability and reusability, several programming techniques have been developed to enhance encapsulation of communicating modules. One of the known techniques is to use an intermediate object to convert the formats of communicated data when the data is transmitted between two modules with mismatching internal data formats, so that the modules can communicate with each other without the need to modify the code of either module. Another similar technique is to intercept and translate messages communicated between incompatible objects before relaying the message to the receiving object. However, code modification may still be required under either of these two approaches in cases where a module needs to communicate different information or perform different communication operations in different environments.

Thus, there is a need to enhance encapsulation of communicating algorithm modules and to improve portability and reusability of module codes encapsulating communicating algorithms.

SUMMARY

In accordance with the invention, at least one communication operation of a computer algorithm is encapsulated in a communication module, separately from the rest of the operations of the algorithm which may be encapsulated in an algorithm module. The separately encapsulated communication operation is made available to the algorithm module during its execution.

Thus, the encapsulation of the algorithm is enhanced in the sense that its communication operation(s) can be modified without changing the algorithm module code. When all environment-dependent communication operations of the algorithm are encapsulated in the communication module code, the algorithm module code can be ported to different environments without changing its code. As many communication operations in a particular environment are common to various algorithms, common communication module codes may be developed so as to further reduce, and sometimes avoid, code modification.

In accordance with one aspect of the invention there is provided a method of executing a computer algorithm. The method comprises executing a first module encapsulating the computer algorithm except at least one communication operation of the algorithm and executing a second module encapsulating the at least one communication operation of the algorithm, such that the at least one communication operation is available to the first module.

In accordance with another aspect of the invention there is provided a computer readable medium storing thereon computer executable instruction code. The code when executed by a processor of a computer causes the processor to execute a first module encapsulating a computer algorithm except at least one communication operation of the algorithm and to execute a second module encapsulating the at least one communication operation of the algorithm, such that the at least one communication operation is available to the first module.

In accordance with yet another aspect of the invention there is provided a method of encapsulating a computer algorithm. The method comprises encapsulating, in a first module code, the computer algorithm except at least one communication operation of the computer algorithm, and encapsulating the at least one communication operation in a second module code, so that one of the first and second module codes can be modified without changing the other one of the first and second module code.

Other aspects, features and advantages of the invention will become apparent to those of ordinary skill in the art upon review of the following description of specific embodiments of the invention in conjunction with the accompanying figures.

BRIEF DESCRIPTION OF THE DRAWINGS

In the figures, which illustrate exemplary embodiments of the invention.

DETAILED DESCRIPTION

In overview, to enhance the encapsulation of a computer algorithm, a communication operation of the algorithm is encapsulated in a communication module, separate from an algorithm module that encapsulates the rest of the algorithm's operations. The operation of the communication module is available to the algorithm module during the execution of the algorithm.

When environment-dependent communication operations are separately encapsulated in one or more communication modules, the algorithm module can be used, without modification, in different environments.

Figure 1:
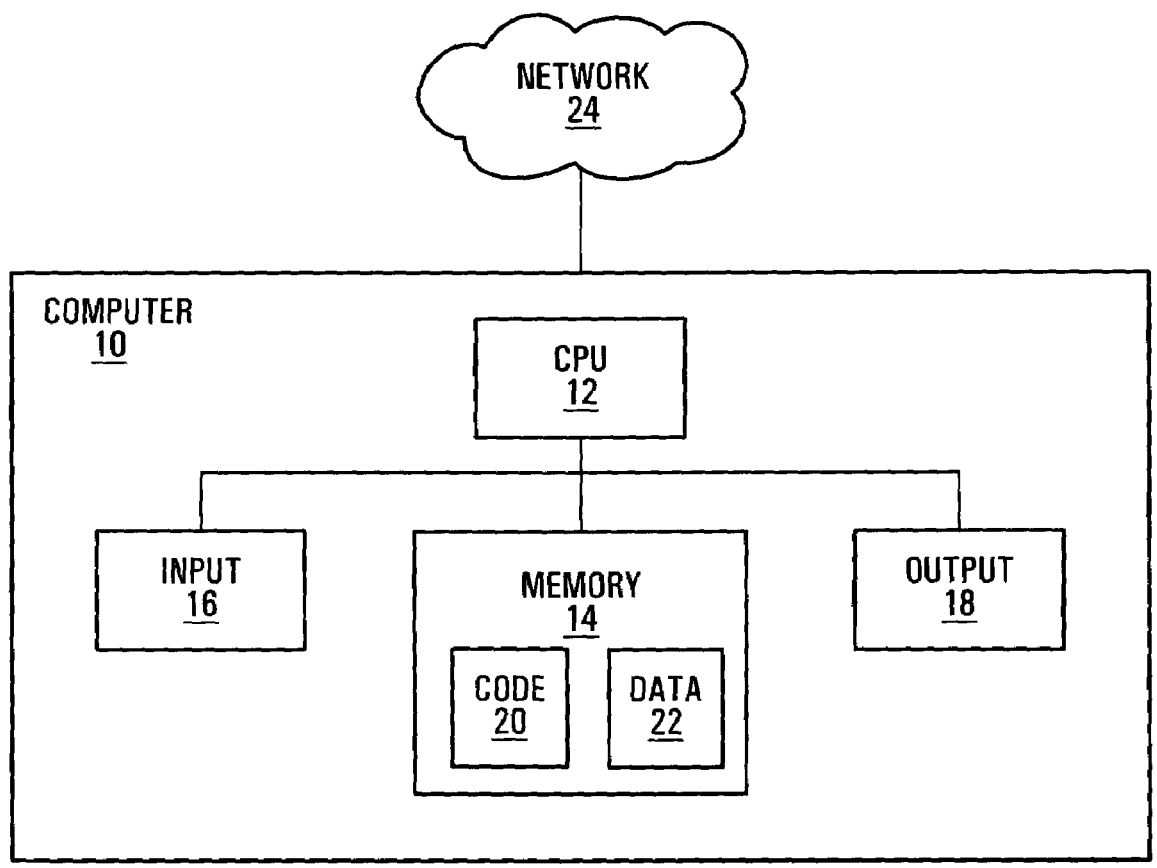
FIG. 1 is a schematic diagram illustrating a computer system.

FIG. 1 illustrates computer 10 on which computer algorithms can be executed in one or more computing environments. As is typical, computer 10 has a processor 12, which communicates with memory 14, input 16 and output 18. Memory 14 may store both computer executable instruction codes 20 and data 22. Computer 10 may optionally communicate with a network 24.

Memory 14 includes a primary electronic storage for processor 12 and may include one or more secondary stores, each of which comprises a computer readable medium. A computer readable medium can be any available medium accessible by a computer, either removable or non-removable, either volatile or non-volatile, including any magnetic storage, optical storage, or solid state storage devices, or any other medium which can embody the desired computer executable instructions and can be accessed, either locally or remotely, by a computer or computing device. Any combination of the above is also included in the scope of computer readable medium.

Input device 16 may comprise, for example, a keyboard, a mouse, a microphone, a scanner, a camera, and the like. It may also include a computer readable medium and the corresponding device for accessing it.

Output device 18 may comprise, for example, display devices, printers, speakers, and the like. It may also include a computer writable medium and the device for writing to it.

Computer 10 may communicate with other computer systems (not shown) on network 24. Network 24 may be embodied using conventional network technologies and may include one or more of the following: local area networks, wide area networks, intranets, the Internet, wireless networks, and the like. For clarity and conciseness, aspects of the present invention are illustrated using only computer 10 throughout the description herein. However, as will be appreciated by those of ordinary skill in the art, aspects of the invention may be distributed amongst one or more networked computing devices, which communicate and interact with computer system 10, via one or more data networks such as network 24.

It will be understood by those of ordinary skill in the art that computer system 10 may also include other, either necessary or optional, components not shown in the figure. By way of example, such other components may include elements of a CPU; network devices and connections, such as modems, telephone lines, network cables, and wireless connections; additional processors; additional memories; additional input and output devices; and so on. Further, two or more components of the computer system 10 may be embodied in one physical device. For example, a CPU chip may also have built-in memory. A memory storage such as a disk can be part of the memory 14, input device 16, and output device 18.

Figure 2A:
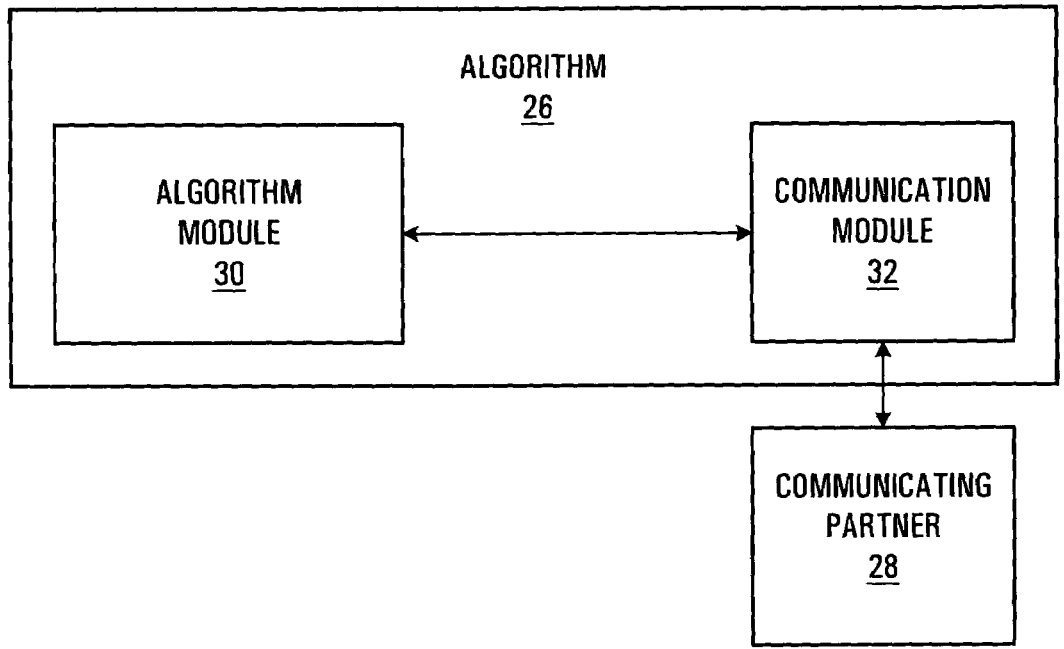
FIGS. 2A and 2B schematically illustrate methods of executing a computer algorithm which communicates with a communicating partner.

FIG. 2A schematically illustrates an exemplary method of executing a computer algorithm 26 which communicates with a communicating partner 28. As mentioned earlier, communicating partner 28 can be an information receiver, or an information provider, or both. Further, communicating partner 28 can be a human operator, a physical device, or a software module. Algorithm 26 has both environment-dependent communication operations and other operations (referred to as algorithm operations herein). The algorithm operations are encapsulated in algorithm module 30. The environment-dependent communication operations are encapsulated in communication module 32.

Figure 2B:
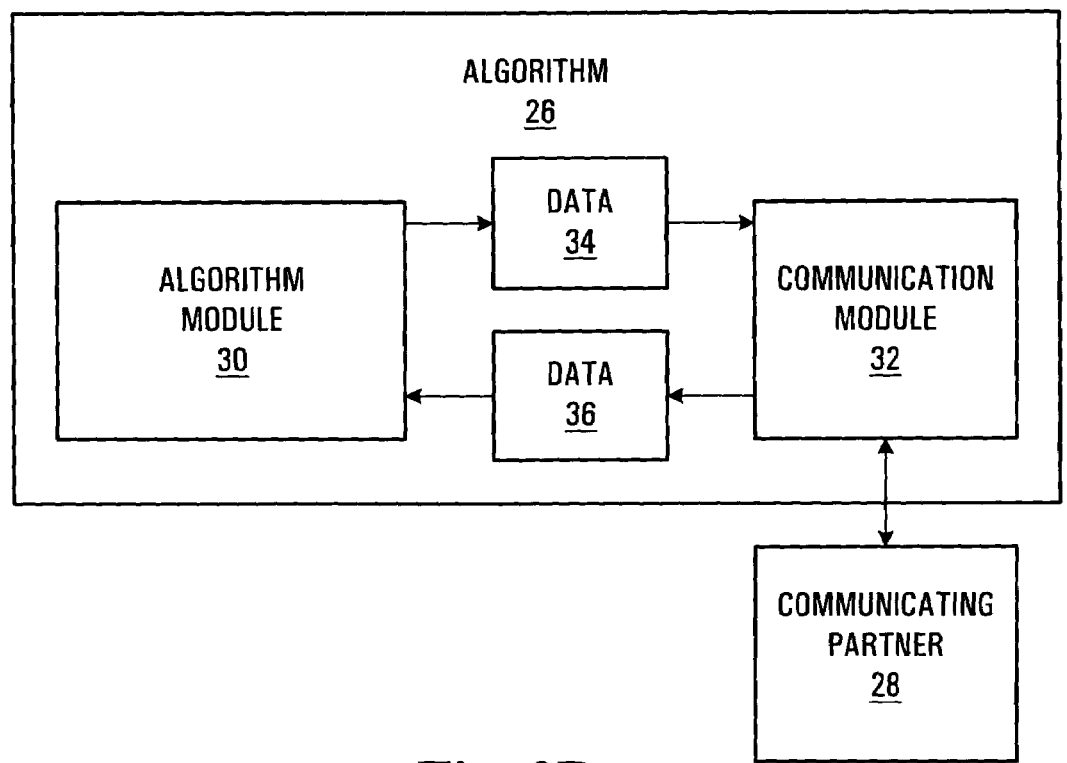

Optionally, one or more data objects may be instantiated during execution to encapsulate data communicated between algorithm module 30 and communicating partner 28. For instance, as illustrated in FIG. 2B, data object 34 may be used to encapsulate all data communicated from algorithm 30 and data object 36 may be used to encapsulate all data communicated to algorithm module 30.

Each one of the modules and objects may be instantiated from a module code. Thus, an exemplary method of coding algorithm 26 is to encapsulate algorithm 26 in at least two module codes. The environment-dependent communication operations may be encapsulated in a communication module code and the algorithm operations may be encapsulated in an algorithm module code. Optionally, data module codes may be provided for encapsulating data to be communicated.

Figure 3:
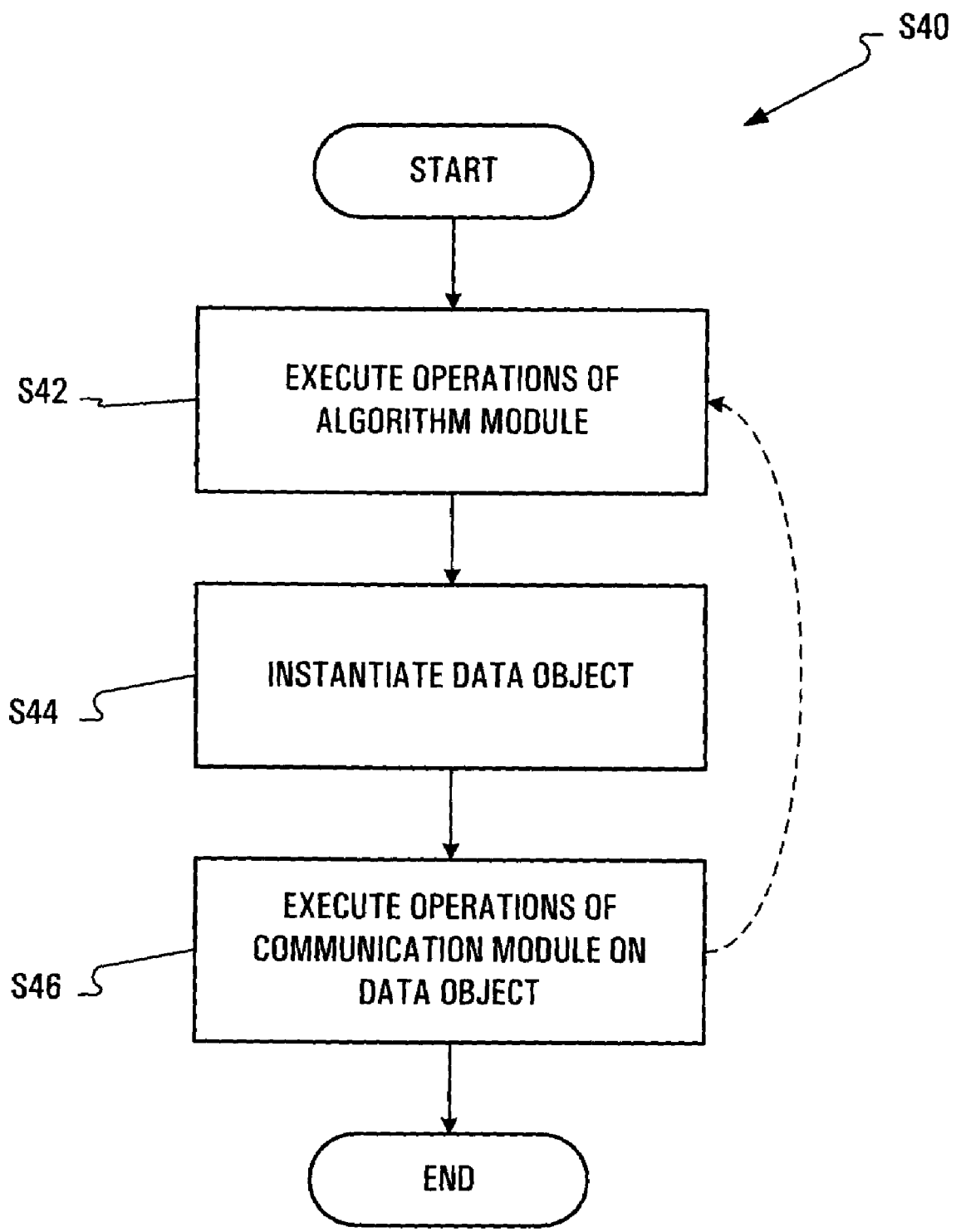
FIG. 3 is a flowchart diagram illustrating executing the computer algorithm coded in FIG. 2B.

In operation, referring to FIG. 2A to FIG. 3, one or more operations of algorithm module 30 are executed (S42) in a given environment. When a need to communicate arises, one or both of data objects 34 and 36 are instantiated (S44), and one or more operations of communication module 32 are executed on at least one of the instantiated data object(s) (S46). An object of communication module 32 can be instantiated any time before it is used. After the execution of the operation(s) of communication module 32 (S46), one or more operations of algorithm module 30 may be further executed, or the process from S42 to S46 may be repeated for either the same or different operations.

To execute algorithm 26 in a new environment, a different communication module code suitable for use in the new environment may be provided. During execution, the operation(s) of the new communication module is (are) made available to the executing algorithm module 30. Thus, the code for algorithm module 30 does not need to be modified.

As common codes for environment-specific operations can be developed and made available, algorithm 26 can be executed in different environments without any code-modification. All that may be required is to choose a particular suitable module encapsulating environment-specific operations. In this regard, it is advantageous to ensure that all the module codes encapsulating algorithm 26 are compatible with each other. To do so, coding protocols (also known as interfaces in Java programming parlance) may be provided and individual modules can be coded in compliance with one or more respective protocols.

To further illustrate how algorithm 26 can be coded, an exemplary set of codes is described below. It should be understood that although the example codes are in Java language, any other suitable programming language may be used to implement an algorithm as taught herein. It is also understood that only relevant parts of the codes are listed and described. The omitted parts, either necessary or optional, can be readily added by those skilled in the art.

Figure 4:
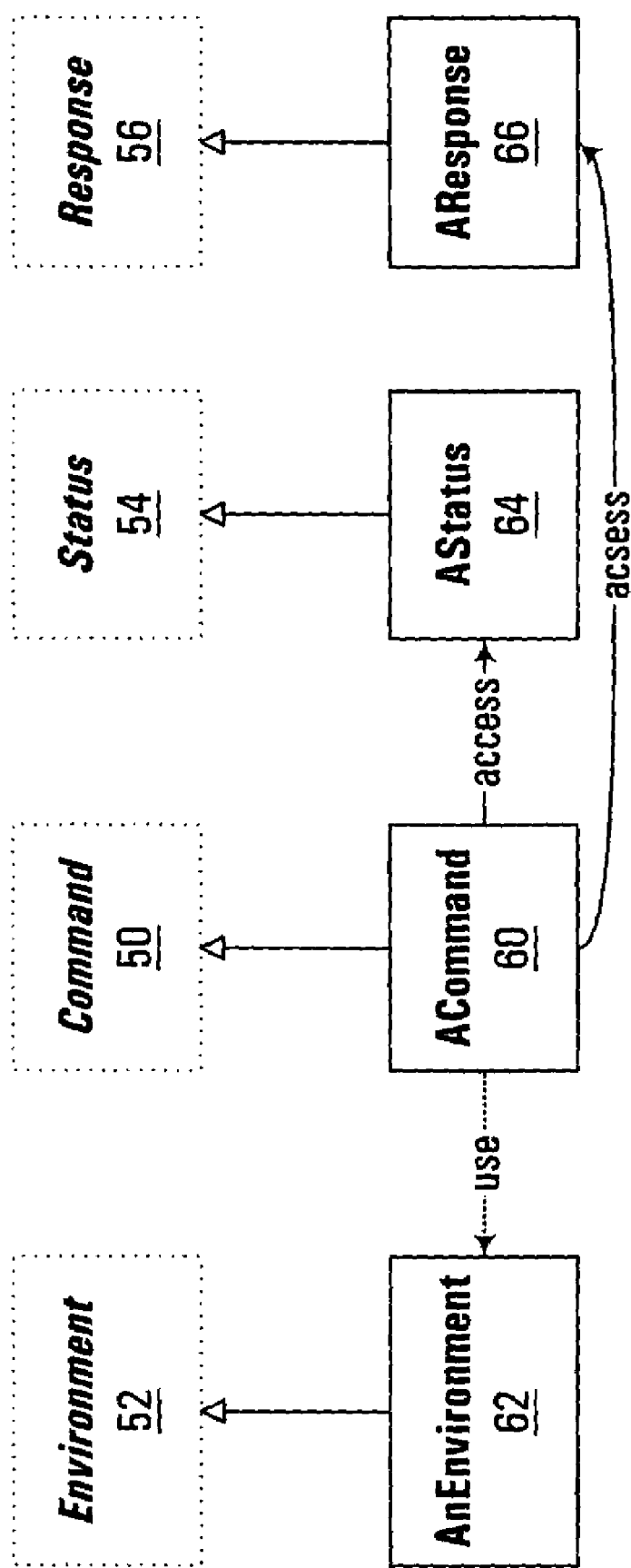
FIG. 4 is a class diagram illustrating the relationships between exemplary interfaces and classes of a Java framework for coding an algorithm as illustrated in FIG. 2B.

Referencing FIG. 4, in an exemplary embodiment of the invention, a Java framework is provided. The framework comprises four abstract interfaces: Command interface 50, Environment interface 52, Status interface 54, and Response interface 56. Each of abstract interfaces 50 to 56 defines a protocol, i.e., certain methods and data types that each compliant class must implement, as well as method behavior. As is typical, method behavior may be described in a documentation such as a JavaDoc. Exemplary codes for these interfaces are listed in Table 1.

TABLE I

| Interface | Sample Code |
|---|---|
| Command | Public Interface Command<br>{<br>  public void execute (Environment environment);<br>} |
| Environment | Public interface Environment<br>{<br>  public Response getResponse (Status status, Response[ ] responses);<br>  public Status reportStatus (Status status);<br>} |
| Status | Public interface Status<br>{<br>  public string getMessage ( );<br>} |
| Response | Public interface Response<br>{<br>  public string getLabel ( );<br>} |

In Java language, computer algorithms are encapsulated in classes. Within the exemplary framework, algorithm module 30 can be implemented in class ACommand 60, which implements Command interface 50; communication module 32 can be implemented in class AnEnvironment 62, which implements Environment interface 52; modules for data objects can be respectively implemented in classes AStatus 64 (for encapsulating data sent by an instance of ACommand 60) and AResponse 66 (for encapsulating data received by an instance of ACommand 60), which in turn respectively implement interfaces Status 54 and Response 56. To illustrate, exemplary codes for these classes are listed below.

ACommand:

```
public class ACommand implements Command
{
    ...
    public void execute ( Environment environment )
    {
        // some operations of the algorithm
        if (AConditionExists)
        {
            Status status = new AStatus("ACondition exists,
            What to do?");
            response = environment.getResponse(status,
            new Response[ ] responses);
        }
        // some operations of the algorithm depending on the returned
        response environment.reportStatus(new AStatus("A Status
        Message"));
    }
}
```

AnEnvironment:

```
...
public class AnEnvironment implements Environment
{
    public void reportStatus( Status status)
    {
        // some environment-dependent communication operations for
        // reporting status via method "status.getMessage( )"
    }
    public Response getResponse ( Status status, Response[ ] responses )
    {
        // some environment-dependent communication operations including
        // output operations making use of method "status.getMessage( )" and
        // input operations making use of method "response.getLabel( )" for
        // each response in the array.
    }
}
```

AStatus:

```
...
public class AStatus implements Status
{
    private String message;
    public AStatus (String message )
    {
        this.message = message;
    }
    public String getMessage ( )
    {
        return message;
    }
}
```

AResponse:

```
...
public class AResponse implements Response
{
    private String label;
    public AResponse ( String label )
    {
        this.label = label;
    }
    public String getLabel ( )
    {
    return label;
    }
}
```

As is typical, to actually execute the algorithm implemented in the above classes, a main class may be implemented, for example as follows:

Main:

```
public class Main
{
    public static void main ( )
    {
        Command c = new ACommand( );
        Environment e = new AnEnvironment( );
        c.execute(e);
    }
}
```

Figure 5:
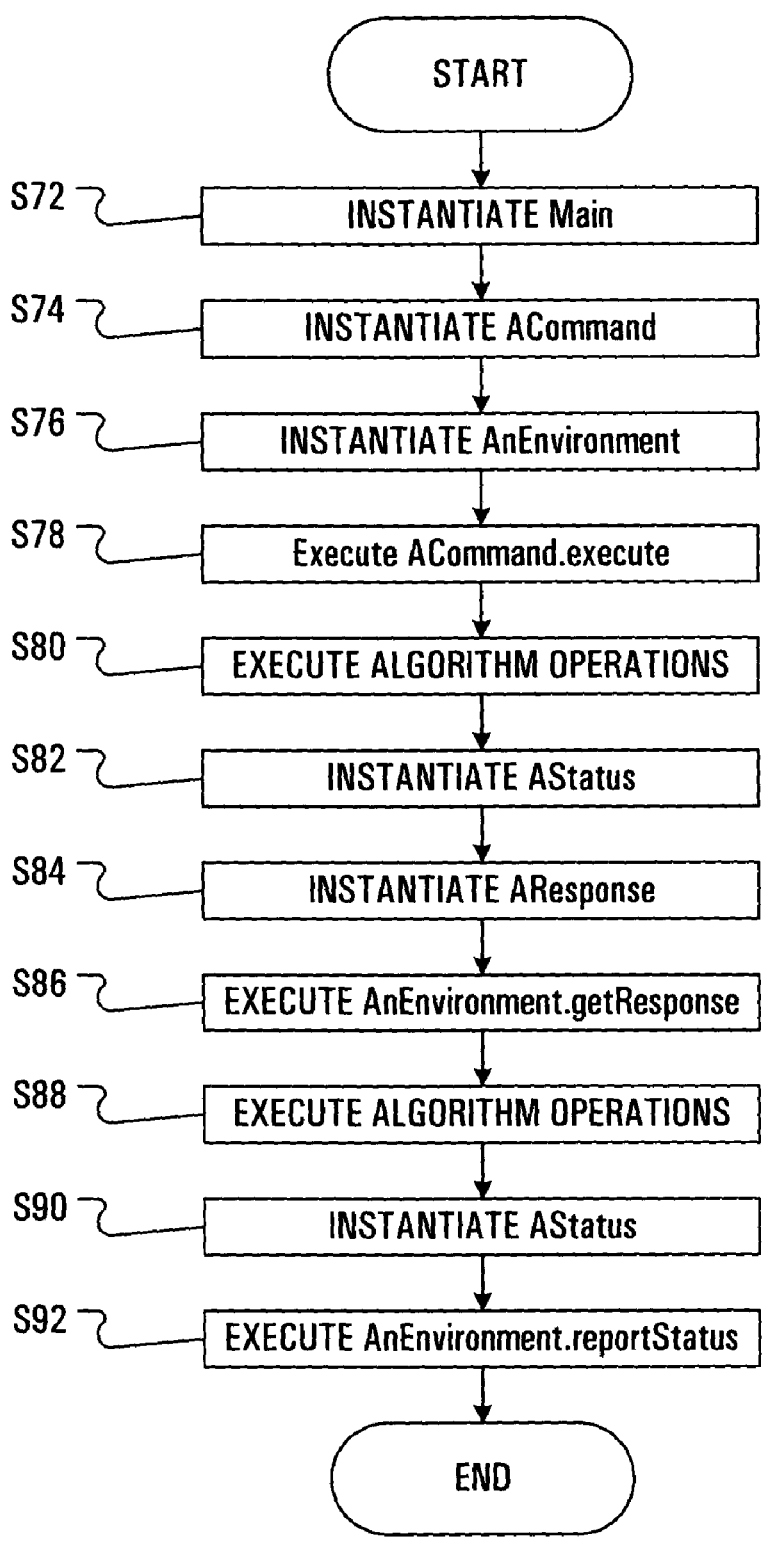
FIG. 5 is a flowchart diagram illustrating the operation of example codes implementing the framework of FIG. 4.

The execution of the above exemplary codes in operation is illustrated in FIG. 5. When class Main is instantiated (S72), an instance of ACommand 60 and an instance of AnEnvironment 62 are respectively instantiated (S74 and S76). The "execute" method of ACommand 60 is then executed (S78) where a parameter ("e") is passed to indicate that the communication module in this execution is an "Environment" module, AnEnvironment 62. Thus, the methods in the object of AnEnvironment 62 are available to the algorithm module. Some algorithm operations may be performed (S80). When a condition arises which requires some input from a communicating partner, an object of AStatus 64 is instantiated (S82) which holds a message indicating the condition (e.g., as illustrated "ACondtionExists. What to do?"). The "getResponse" method of AnEnvironment 62 is called, by which time an object of AResponse 64 is instantiated (S84) which will hold the response from the communicating partner. The "getResponse" method is executed (S86) to get a response from a communicating partner. After obtaining a response, some further algorithm operations can be executed (S88) based on the return value of the response. Finally, a new object of AStatus 64 is instantiated to hold a new status message (S90) and the status message is reported by executing the "reportStatus" method of the environment object (S92).

As is now clear, and advantageously, the Command class does not need to be modified when a new kind of an Environment class needs to be used.

The above codes are for illustration purposes only and can be modified as appropriate for a particular algorithm or environment. For example, Environment interface 52 may specify a method for reporting execution progress or for logging results of the operations of the algorithm. These methods can be implemented according to known programming techniques.

Further, the timing and the order in which some objects are instantiated may change. For example, the order in which Command object and Environment object are instantiated may be reversed, so long as the methods of Environment object are available to Command object during execution of the operations of the algorithm. The order in which the operations of various modules are executed may also vary. For example, an operation of a communication module may be executed before any operation of an algorithm module is executed.

Of course, all environment-dependent operations of algorithm 26 may be separately encapsulated so that the algorithm module code is environment independent and need not be modified when used in different environments. However, in appropriate situations, it may be desirable to encapsulate separately only some environment-dependent operations. Even so, encapsulation of the algorithm is still enhanced as the algorithm module code need not be modified when the separately encapsulated operations need to be changed.

Further, the environment-dependent operations of algorithm 26 may be encapsulated in multiple modules. Similarly, the algorithm operations of algorithm 26 may also be encapsulated in more than one module. Different modules may be executed on different computers in a network.

Additional functionality may also be implemented in any of the modules or objects. For example, an Environment object may deploy a Monitor object for monitoring the status of execution of a command object.

Other features, benefits and advantages of the present invention not expressly mentioned above can be understood from this description and the accompanying drawings by those skilled in the art.

Although only a few exemplary embodiments of this invention have been described above, those skilled in the art, once taught the invention, will readily appreciate that many modifications are possible therein without materially departing from the novel teachings and advantages of this invention.

The invention, rather, is intended to encompass all such modification within its scope, as defined by the claims.

What is claimed is:

1. A method of executing a computer algorithm in an execution environment, comprising:

executing an algorithm module encapsulating said computer algorithm except at least one execution environment dependent communication operation of said algorithm in said execution environment;

executing a communication module encapsulating said at least one execution environment dependent communication operation of said algorithm in said execution environment, such that said at least one execution environment dependent communication operation is available to said algorithm module;

providing a different communication module encapsulating another execution environment dependent communication operation of said algorithm suitable for a second execution environment while maintaining said algorithm module when said algorithm is being executed in said second execution environment; and instantiating at least one data object for encapsulating data communicated between said algorithm module and a communicating partner via said communication module or said different communication module during execution of said algorithm, wherein said at least one execution environment dependent communication operation or said another execution environment dependent communication operation is executed on at least one of the instantiated data object, each one of said at least one data object being an instance of a data class.

2. The method of claim 1, wherein said at least one execution environment dependent communication operation comprises all execution environment dependent communication operations of said algorithm.

3. The method of claim 1, wherein data communicated from said algorithm module is encapsulated in a first data object being an instance of a first data class, and data communicated to said algorithm module is encapsulated in a second data object being an instance of a second data class.

4. The method of claim 3, wherein said communication module comprises a communication object, said communication object being an instance of a communication class.

5. The method of claim 4, wherein said algorithm module comprises a command object, said command object being an instance of a command class.

6. The method of claim 5, wherein each one of said classes implements one of a plurality of protocols of a framework, such that instances of said classes are compatible with each other.

7. The method of claim 6, wherein said framework is a Java framework and each one of said plurality of protocols is respectively encapsulated in an interface.

8. The method of claim 7, wherein said command class implements a command interface, said command interface defining at least one method of executing, said method of executing defined by said command interface comprises taking an indicator of said communication object as a parameter, thereby an operation of said communication object is available to said command object.

9. The method of claim 8, wherein said communication class implements a communication interface, said communication interface defining at least one method of communication.

10. The method of claim 9, wherein said at least one method of communication comprises a method of communicating data from said first data object to said communication partner.

11. The method of claim 10, wherein said at least one method of communication comprises a method of communicating data from said communicating partner to said second data object.

12. A computer readable medium storing thereon computer executable instruction codes, said codes when executed by a processor of a computer causes said processor to:

execute an algorithm module encapsulating a computer algorithm except at least one execution environment dependent communication operation of said algorithm in said execution environment;

execute a communication module encapsulating said at least one execution environment dependent communication operation of said algorithm in said execution environment, such that said at least one execution environment dependent communication operation is available to said algorithm module;

provide a different communication module encapsulating another execution environment dependent communication operation of said algorithm suitable for a second execution environment while maintaining said algorithm module when said algorithm is being executed in said second execution environment; and instantiate at least one data object for encapsulating data communicated between said algorithm module and a communicating partner via said communication module or said different communication module during execution of said algorithm, wherein said at least one execution environment dependent communication operation or said another execution environment dependent communication operation is executed on at least one of the instantiated data object, each one of said at least one data object being an instance of a data class.

13. The computer readable medium of claim 12, wherein said computer executable instruction codes include codes for implementing said algorithm module, said communication modules and each one of said algorithm and communication module codes implements a common protocol so that said algorithm and communication module codes are compatible.

* * * * *

UNITED STATES PATENT AND TRADEMARK OFFICE
CERTIFICATE OF CORRECTION

PATENT NO. : 7,644,412 B2
APPLICATION NO. : 10/669396
DATED : January 5, 2010
INVENTOR(S) : Brealey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1869 days.

Signed and Sealed this

Sixteenth Day of November, 2010

David J. Kappos
*Director of the United States Patent and Trademark Office*